United States Patent [19]

Thubert

[11] Patent Number: 4,910,719

[45] Date of Patent: Mar. 20, 1990

[54] PASSIVE SOUND TELEMETRY METHOD

[75] Inventor: Dominique Thubert, Sceaux, France

[73] Assignee: Thomson-CSF, Paris, France

[21] Appl. No.: 184,095

[22] Filed: Apr. 20, 1988

[30] Foreign Application Priority Data

Apr. 24, 1987 [FR] France .................................. 87 05829

[51] Int. Cl.$^4$ .................................................. G01S 5/18
[52] U.S. Cl. ...................................... 367/125; 342/189
[58] Field of Search ............... 367/119, 123, 124, 125,
367/100, 103, 12; 342/189, 151, 154, 189

[56] References Cited

U.S. PATENT DOCUMENTS

| | | | |
|---|---|---|---|
| 3,249,911 | 5/1966 | Gustafsson . | |
| 3,750,152 | 7/1973 | Waful | 367/125 |
| 3,947,803 | 3/1976 | Brown | 367/125 |
| 4,198,704 | 4/1980 | Munson | 367/125 |
| 4,480,322 | 10/1984 | Orieux et al. | 367/125 X |
| 4,552,020 | 11/1985 | Auphan | 367/100 X |
| 4,601,025 | 7/1986 | Lea . | |

FOREIGN PATENT DOCUMENTS 0063517 10/1982 European Pat. Off. .
2094091 2/1972 France .

OTHER PUBLICATIONS

IEEE Transactions of Acoustics, Speech & Signal Processing, vol. ASSP-29, No. 3, Partie II, juin 1981, pp. 463–470, New York, US; G. C. Carter: "Time Delay Estimation for Passive Sonar Signal Processing"* pp. 465–468, Paragraphs V,VII *.

Primary Examiner—Stephen C. Buczinski
Assistant Examiner—Tod Swann
Attorney, Agent, or Firm—Oblon, Spivak, McClelland, Maier & Neustadt

[57] ABSTRACT

In a method for locating sound sources, signals from three aligned sensors are processed by correlating the signals of the central sensor with those of the outer sensors and then by processing the correlation signals so as to maximize the sum of these signals, thus making it possible to identify the position of the noise sources more efficiently.

3 Claims, 2 Drawing Sheets

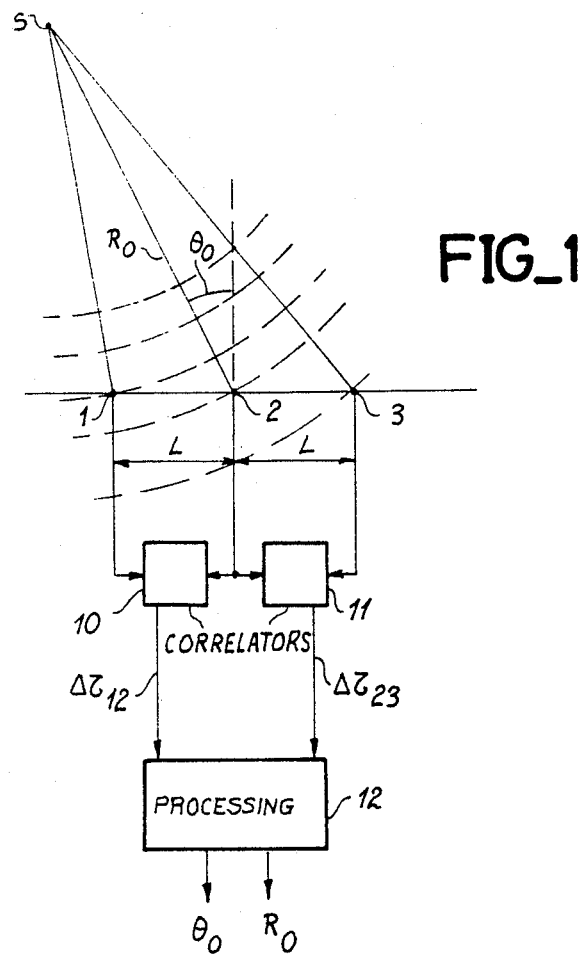
FIG_1
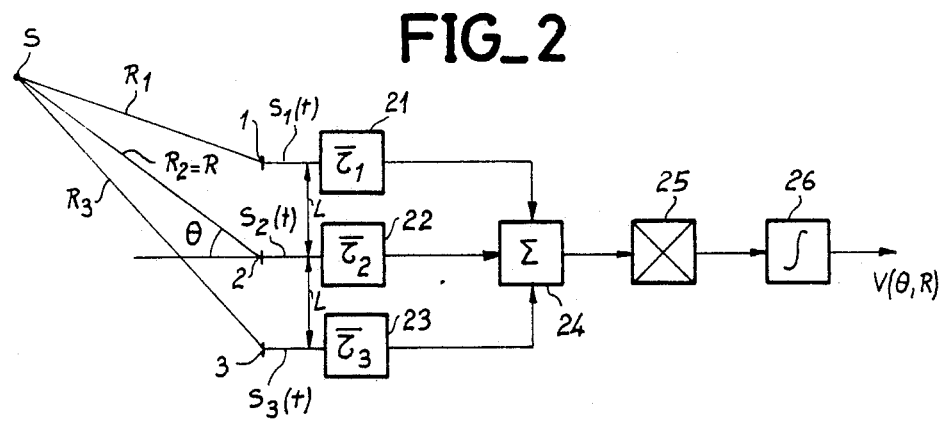
FIG_2

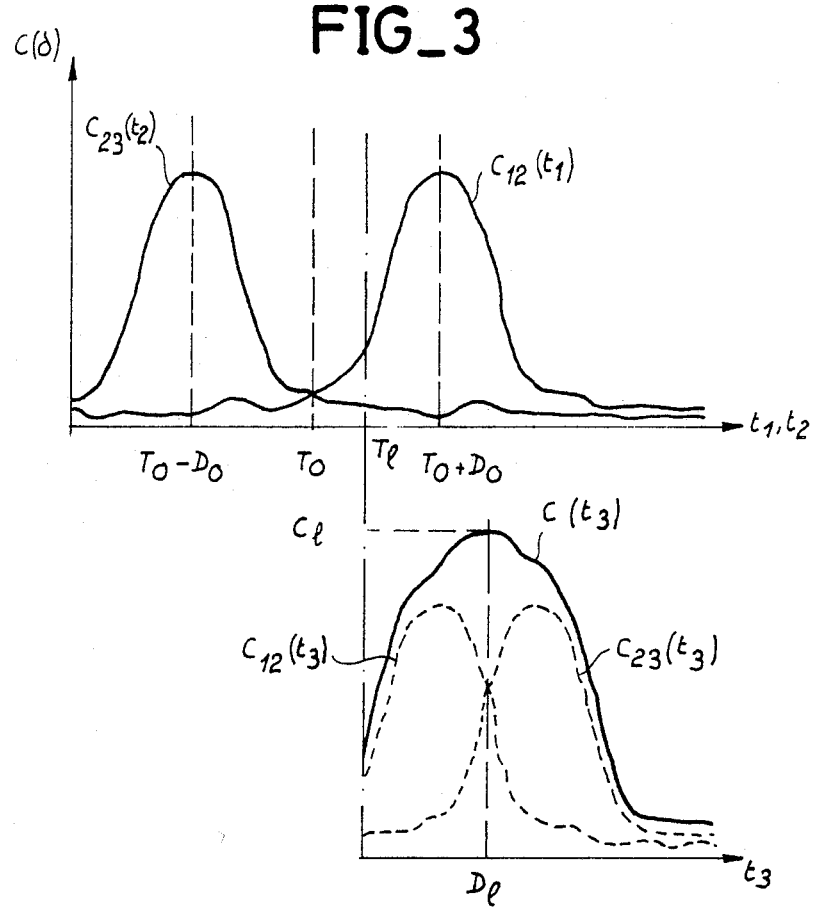
FIG_3
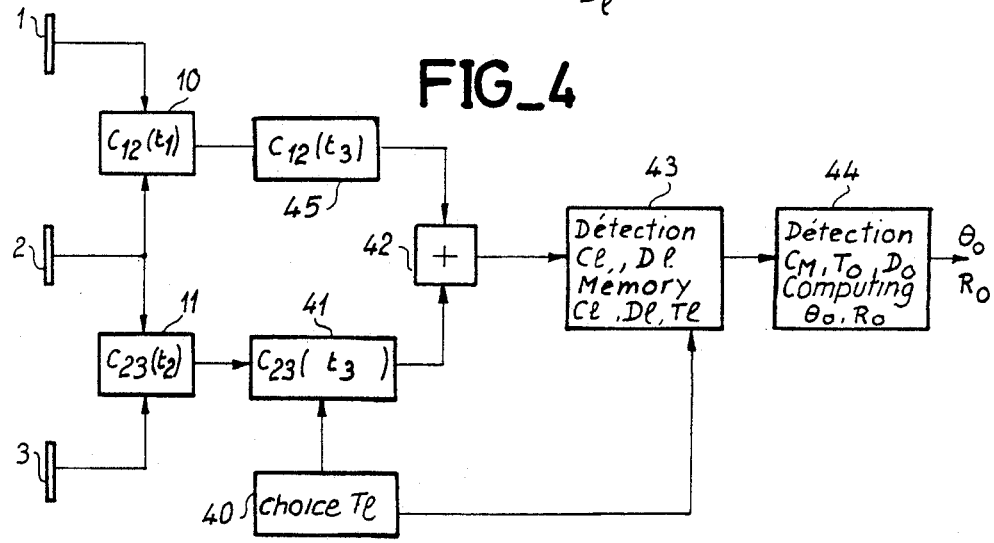
FIG_4

PASSIVE SOUND TELEMETRY METHOD

BACKGROUND OF THE INVENTION

1. Field of the Invention

The present invention relates to passive sound telemetry methods in which the distance and direction of a noise source are measured with at least three separate sensors, by suitably processing the signals given by these sensors in response to the noise that they receive.

2. Description of the Prior Art

A known method, as shown in FIG. 1, uses three aligned sensors 1, 2 and 3, at a distance L from one another. A noise source S is located in a directional angle $\theta_0$, identified with respect to the normal to the alignment of the three sensors, and at a distance $R_0$ from the central sensor 2. The source radiates a noise that is propagated on an almost circular wavefront. The radiated noise therefore reaches the antenna at different instants. Thus, in the case of FIG. 1, the wavefront reaches the sensor 1 first. Then it reaches the sensor 2 with a delay $\Delta i_{12}$ and, finally, the sensor 3 with a delay $\Delta i_{23}$ after the sensor 2. These two differences, $\Delta i_{12}$ and $\Delta i_{23}$, in the time taken to reach the two receivers gives the direction $\theta_0$ and the distance $R_0$ according to the following approximated expressions:

$$\theta_0 = \arcsin \frac{c(\Delta \tau_{12} + \Delta \tau_{23})}{2L} \quad (1)$$

$$R_0 = \frac{L^2 \cos^2 \theta_0}{c(\Delta \tau_{23} - \Delta \tau_{12})} \quad (2)$$

where c is the speed of the waves.

In existing passive telemetry systems, especially those designed for submarine acoustics, the three sensors constitute three antennas with which directional channels are formed so as to give improved sensitivity. In a first system, called system A, for each channel corresponding to a direction $\theta$, the antenna 1 and 2 channel signals, on the one hand, and the antenna 3 and 4 channel signals, on the other hand, are correlated in two circuits 10 and 11. The positions of the maximums of these two intercorrelation functions give the measurements of $\Delta i_{12}$ and $\Delta i_{23}$. Through a processing circuit 12, these measurements can be used to determine $\theta_0$ and $R_0$.

In a second system, called B, delays $\overline{\tau_1}$, $\overline{\tau_2}$ and $\overline{\tau_3}$ are applied to the signals of the channels of the three antennas. These delays correspond to a point S in the space identified at R and $\theta$. This amounts to focusing the measurement on the point S. The three signals are then added up, detected and integrated. Thus, at a given instant, there is a function $V(\theta, R)$ which touches a maximum for the values $\theta_0$, $R_0$ corresponding to the position of the noise source.

This more compliated system gives greater detecting efficiency. In particular, at the detection limit, this system can be used to measure $\theta_0$ and $R_0$, whereas the measurement would be impossible with the system A since the signal is not detected. The system B is more complicated than the system A because it requires each signal to be delayed separately to obtain each point of the function $V(\theta, R)$.

SUMMARY OF THE INVENTION

According to the invention, the three signals are correlated as in the system A, and then the correlation signals obtained are processed to get, as in the system B, a function for which the maximum that corresponds to the values $\theta_0$, and $R_0$ is be determined.

BRIEF DESCRIPTION OF THE DRAWINGS

Other specific features and advantages of the invention will emerge more clearly from the following description, given as a non-restrictive example and made with reference to the appended drawings of which:

FIG. 1 is a diagram of a first prior art telemetry system;

FIG. 2 is a diagram of a second prior art telemetry system;

FIG. 3 shows explanatory graphs;

FIG. 4 is a diagram of a telemetry system according to the invention.

DESCRIPTION OF THE PREFERRED EMBODIMENT

In the system shown in FIG. 2, the signals emitted by a noise source S are received at the three aligned sensors (or sub-antennae) which respectively deliver the signals $S_1(t)$, $S_2(t)$, $S_3(t)$.

As shown in FIG. 2, the signals $S_1(t)$ are time-lagged in the circuits 21, 22 and 23 by the delays $\overline{\tau_1}$, $\overline{\tau_2}$, $\overline{\tau_3}$, computed for a circular wavefront. These signals are then added up in the adder 24. The signal obtained is then detected quadratically in a detector 25 and then integrated in an integrator 26 for a period T' to give a signal V. Since the central sensor 2 is taken as the time reference, the angle $\theta$ corresponds to the direction of the source S, and $R_2 = R$ at its distance. Hence, the signal V is a function of $\theta$ and R.

The signals $S_1(t)$ are zero-sum random signals. It is assumed here that the noises $B_i(t)$ have the same level on all three sensors.

The expression of the output signal $V(\theta, R)$ is therefore:

$$V(\theta, R) = \frac{1}{T'} \int_0^T [S_1(t - \overline{\tau_1}) + S_2(t - \overline{\tau_2}) + S_3(t - \overline{\tau_3})]^2 dt \quad (3)$$

We may recall the definition of the products of intercorrelation:

$$C_{XX}(\tau) = \frac{1}{T'} \int_0^T X(t - \tau) X(t) dt$$

$$\text{and } C_{BB}(\tau) = \frac{1}{T'} \int_0^T B(t - \tau) B(t) dt$$

Each signal $S_i(t)$ consists of a "signal" portion $X(t + \tau_i)$ and an unwanted ambient "noise" portion $B_i(t)$, $\tau_i$ being the effective delay ($i_i = R_i/c$) of the sound waves radiated by the source S towards the sensor i. The expression of the signal is: $S_i(t) = X(t + i_i) + B_i(t)$. Since the sensors 1, 2, 3 are at a distance L much greater than the mean wavelength of the signals received, the noises $B_i(t)$ are received by the sensors are independent of one another.

Furthermore, the signal $X(t + \tau_i)$ is uncorrelated from the noises $B_i(t)$. When the integration period T' is much greater than the reverse of the frequency band, an equivalent expression of $V(\theta, R)$ is obtained:

$$V(\theta,R) = 3(C_{XX}(0) + C_{BB}(0)) + 2C_{XX}(\overline{\Delta\tau_{12}} - \Delta\tau_{12}) +$$
$$2C_{XX}(\overline{\Delta\tau_{23}} - \Delta\tau_{23}) +$$
$$2C_{XX}(\overline{\Delta\tau_{13}} - \Delta\tau_{13})$$

with $\Delta\tau_{ij} = \tau_i - \tau_j$ et $\overline{\Delta\tau_{ij}} = \overline{\tau_i} - \overline{\tau_j}$ For the expression (3) can be broken down into six terms. There are three terms in $S_i^2$ and three terms in $S_iS_j$. The three terms in $S_i^2$ give the term $3(C_{XX}(0)+C_{BB}(0))$. Each term in $S_iS_j$ can be broken down into four terms:

$$S_i(t - \overline{\tau_i})S_j(t - \overline{\tau_j}) = X(t + \tau_i - \overline{\tau_i})X(t + \tau_j - \overline{\tau_j}) +$$
$$X(t + \tau_i - \overline{\tau_i})B_j(t) +$$
$$X(t + \tau_j - \overline{\tau_j})B_i(t) +$$
$$B_i(t)B_j(t)$$

Taking the above conclusions into account, there remains:

$$\frac{1}{T}\int_0^T X(t + \tau_i - \overline{\tau_i})X(t + \tau_j - \overline{\tau_j})dt$$

This can also be written as follows by simply changing the origin of the periods t:

$$\frac{1}{T}\int_0^T X[t - (\overline{\tau_i} - \tau_i - \tau_j - \overline{\tau_j})]X(t)dt = C_{XX}(\overline{\Delta\tau_{ij}} - \Delta\tau_{ij})$$

The differences between the delays $\overline{\Delta\tau_{ij}}$ can be written:

$$\overline{\Delta\tau_{12}} = T(\theta) + D(\theta,R) = T + D$$

$$\overline{\Delta\tau_{23}} = T(\theta) - D(\theta,R) = T - D$$

$$\overline{\Delta\tau_{13}} = 2T(\theta) = 2T$$

By carrying these differences to (4), it can be seen that the only terms that depend on the distance are:

$$C_{XX}(\overline{\Delta\tau_{12}} - \Delta\tau_{12}) \; et \; C_{XX}(\overline{\Delta\tau_{23}} - \Delta\tau_{23})$$

To locate the noise source S, it is necessary to seek the values of R and $\theta$ which maximize the function (4).

For each intercorrelation $C_{ij}(/i_{ij})$, and according to the above conclusions, there remains only the "signal" term, namely:

$$C_{ij}(\Delta\tau_{ij}) = \frac{1}{T}\int_0^T X(t + \tau_i - \overline{\tau_i})X(t + \tau_j - \overline{\tau_j})dt$$

which is strictly equal to $C_{XX}(\overline{\Delta\tau_{ij}} - \Delta\tau_{ij})$.

It is therefore possible, in an equivalent way, to seek the maximum of the function $G(\theta, R)$ such that:

$$G(\theta,R) = C_{12}(\overline{\Delta\tau_{12}}) + C_{23}(\overline{\Delta\tau_{23}}) \quad (5)$$

With the above defined notations we get:

$$G(\theta,R) = C_{12}[T(\theta) + D(\theta,R)] + C_{23}[T(\theta) - D(\theta,R)] \quad (6).$$

which is the sum of the two functions $C_{12}$ and $C_{23}$ of the system A.

The values of $\theta$ and R which maximize the function (6) can be used to locate the noise source. The system of the invention gives the advantages of sensitivity provided by the system B, due to the focusing of the channels, without the complication and processing time related to the need to delay the received signals by an entire series of values. The correlation means used are similar to those of the system A.

The input signals of these correlators are functions of time, and the output signals are functions of the variables $t_1 = T + D$ and $t_2 = T - D$ which both have the dimensions of a delay.

These output signals are shown in the top graph of FIG. 3. It can be seen in this figure that the curves intersect for $t_1 = t_2 = T_0$ and respectively touch maximum levels for $t_1 = T_0 + D_0$ and $T_2 = T_0 - D_O$. Initially, a special value $T_1$ is fixed. Then the two curves $C_{12}(T_1 + D)$ and $C_{23}(T_1 - D)$ are added up point by point in making D vary. This amounts to adding up the two correlation functions by taking symmetrical points around the abscissa $T_1$. Each of these pairs of points therefore corresponds to abscissae $T_1 + D_1$ and $T_1 - D_1$. This gives a curve $C(t_3)$ shown in the bottom graph of FIG. 3. In practice, to construct $C(t_3)$, it is enough to turn the curve $C_{23}(T_2)$ back around the abscissa $T_1$ axis giving $C_{23}(T_3)$ and to add up $C_{23}(t_3)$ and the curve $C_{12}(t_1)$.

According to the invention, this curve $C(t_3)$ shows a maximum $C_1$ when $t_3$ assumes a value $D_1$ close to $D_0$.

The process is iterated for different values of $T_1$, giving a series of values $T_1$, $D_1$, $C_1$.

From among the set of values $C_1$ the maximum value, namely $C_M$, is chosen. The maximum value of the function $G(\theta,R)$ naturally corresponds to this value, and the corresponding values of T and D are therefore $T_0$ and $D_0$ from which $\theta_0$ and $R_0$ are then deduced.

Thus, as can be seen in FIG. 3, this absolute maximum corresponds graphically to a superimposition of the curves $C_{12}$ and $C_{23}$ when the latter has been turned back around the abscissa $T_0$ axis.

To implement the method according to the invention, a system, of the type shown in FIG. 4 for example, is used.

The sound signals reach the transducers 1 to 3 which deliver electrical signals applied to the correlators 10 and 11 wherein the processing operation, used to obtain the functions $C_{12}(t_1)$ and $C_{23}(t_2)$, is performed.

A testing circuit 40 is used to select the successive values of $T_1$.

This testing circuit then commands a computing circuit 41 which gives the function $C_{23}(t_3)$.

Another computing circuit 45 is used to obtain the function $C_{12}(t_3)$.

An adder 42 is then used to add up $C_{12}(23)$ and $C_{23}(t_3)$ to obtain $C(t_3)$.

In another computing circuit 43, $C(t_3)$ is used to determine the maximum value $C_1$ and the corresponding value $D_1$. It memorizes these two values at the same time as the corresponding value $T_1$ which it receives from the circuit 40.

A last computing circuit 44 is used to obtain the maximum value $C_M$ of the $C_1$ values in the memory of the circuit 43. The corresponding values $T_0$ and $D_0$ taken by $T_1$ and $D_1$ can be used to compute $\theta_0$ and $R_0$.

As an alternative method, all these operations can be performed with a suitably programmed digital computer.

It will also be observed that if the point of intersection of the curves $C_{12}(t_1)$ and $C_{23}(t_2)$ cannot be used to obtain $T_0$ directly with high precision, this intersection point gives an order of magnitude of $T_0$. The search range can therefore be limited by taking the first values of $T_1$ in the zone where $T_0$ is obviously located.

Furthermore, it is not necessary for the three sensors to be equidistant by a distance L.

For, if the sensor 1 is at a distance $L_1$ from the sensor 2, for example, and if the sensor 2 is at a distance $L_2$ from the sensor 3, the functions $C_{12}(t_1)$ and $C_{23}(t_2)$ will have maximum values respectively located at $T_{10}+D_{10}$ and $T_{20}-D_{20}$.

In view of the relationships between T, D and R, $\theta$, we go from $T_1$, $D_1$ to $T_2$, $D_2$ by the homothetical relationships:

$$T_2 = \frac{L_2}{L_1} T_1 \; et \; D_2 = \left[\frac{L_2}{L_1}\right]^2 D_1$$

The above-described principle for processing the signals does not change, but these homothetical relationships have to be taken into account. For this, it is necessary to use no longer a single abscissa value $T_1$ but two values $T_{11}$ and $T_{12}$ such that $T_{12}=L2/L1 T_{11}$. Then the values of $C_{12}(t_1)$ and $C_{23}(t_2)$ respectively obtained for the series of values $T_{11}+D_1$ and $T_{12}-D_2$ are added up (with $D_2=L2/L1\ ^2D_1$ in order to obtain the curve $C(t_3)$. Since the homothetical transformation is taken in this direction, we obtain the maximum $C_M$ for the value $D_{11}$. Of course, the homothetical transformation can be taken in the other direction to obtain the value $D_{12}$, but this would not change the result in any way. The iteration of this process again leads to obtaining the absolute maximum $C_M$ for $T_{10}$ and $D_{10}$.

What is claimed is:

1. A passive sound telemetry method, comprising the steps of:
  receiving sound signals coming from a source located in a direction $\theta_0$ at a distance $D_0$ wherein said sound signals are received at a central sensor which is surrounded by at least two outer sensors located at a distance L from said sensor and wherein said sensors emit electrical signals in response to said received sound signals;
  making a first correlation between the electrical signals emitted by said central sensor and one of said outer sensors in order to obtain a first correlation signal $C_{12}(t_1)$ as a function of a first parameter $t_1$;
  making a second correlation between the electrical signals emitted by said central sensor and another one of said outer sensors in order to obtain a second correlation signal $C_{23}(t_2)$ as a function of a second parameter $T_2$;
  selecting a first arbitrary value $T_1$ of the parameters $t_1$ and $t_2$;
  adding on a point by point basis the two signals $C_{23}(t_1)$ and $C_{23}(t_2)$ and assigning values $T_{1+D}$ for $T_1$ and $T_{1-D}$ for $T_2$ wherein said values are symmetrical around the value $T_1$, in order to obtain a third signal $C(t_3)$ as a function of a third parameter $t_3$ wherein the maximum $C_1$ of said third signal and the value $D_1$ of the value $t_3$ corresponding to said maximum $C_1$ are determined; and
  repeating said steps in an iteration for a series of values of $t_1$, the absolute maximum $C_M$, taken by $C_1$ for said series of values and determining the values of $T_0$ and $D_0$ of $T_1$ and $D_1$ corresponding to said series of values; and
  determining the direction $\theta_0$ and distance $R_0$ from the formula; $T_0=(1/c) \sin \theta_0$ and $D_0=(L^2/2ROc) \cos^2 \theta_0$ where c is the speed of sound.

2. A method according to claim 1 wherein the two outer sensors are aligned on a straight line passing through the central sensor and are at a distance of a length L from the central sensor.

3. A method according to claim 1 wherein the two outer sensors are aligned on a straight line passing through the central sensor, the first sensor being at a distance of a length $L_1$ from the central sensor and the second sensor being at a distance $L_2$ from the central sensor and wherein, for the parameters T and D, the pairs of values $T_1$, $T_2$ and $D_1$, $D_2$ are used, combined by the homothetical relationships:

$$T_2 \frac{L_2}{L_1} T_1 \; and \; D_2 = \left(\frac{L_2}{L_1}\right)^2 D_1.$$

* * * * *